US012780720B2

(12) United States Patent
Choi et al.

(10) Patent No.: US 12,780,720 B2
(45) Date of Patent: Nov. 3, 2026

(54) CHALCOGENIDE GLASS COMPOSITION INCLUDING SILICON, GALLIUM AND TELLURIUM, AND INFRARED TRANSMITTING LENS INCLUDING THE SAME

(71) Applicant: Industry-University Cooperation Foundation Korea Aerospace University, Goyang-si (KR)

(72) Inventors: Yong Gyu Choi, Goyang-si (KR); Hyun Kim, Seoul (KR); Il Jung Yoon, Seoul (KR)

(73) Assignee: INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 526 days.

(21) Appl. No.: 18/234,943

(22) Filed: Aug. 17, 2023

(65) Prior Publication Data

US 2024/0059603 A1 Feb. 22, 2024

(30) Foreign Application Priority Data

Aug. 18, 2022 (KR) ........................ 10-2022-0103454
Sep. 1, 2022 (KR) ........................ 10-2022-0110982

(51) Int. Cl.
*C03C 3/32* (2006.01)

(52) U.S. Cl.
CPC .............. *C03C 3/323* (2013.01); *C03C 3/321* (2013.01)

(58) Field of Classification Search
CPC ............ C03C 3/321; C03C 3/323; C03C 4/10
See application file for complete search history.

(56) References Cited

U.S. PATENT DOCUMENTS

| | | | |
|---|---|---|---|
| 2020/0017399 A1 | 1/2020 | Click et al. | |
| 2020/0131080 A1 | 4/2020 | Yuan | |
| 2020/0346969 A1 | 11/2020 | Li et al. | |
| 2021/0053866 A1 * | 2/2021 | Matsushita | C03C 3/062 |

FOREIGN PATENT DOCUMENTS

| | | | | |
|---|---|---|---|---|
| CN | 110981206 A | 4/2020 | | |
| CN | 111087175 A | 5/2020 | | |
| JP | 2018-177565 A | 11/2018 | | |
| JP | 2019147723 A * | 9/2019 | | G02B 5/208 |
| KR | 10-1494439 B1 | 2/2015 | | |
| KR | 10-2017-0000899 A | 1/2017 | | |
| KR | 10-2017-0006017 A | 1/2017 | | |

(Continued)

OTHER PUBLICATIONS

Office Action received for Korean Patent Application No. 10-2023-0107473, mailed on Jul. 26, 2024, 13 pages (7 pages of English Translation and 6 pages of Original Document).

(Continued)

*Primary Examiner* — Noah S Wiese
(74) *Attorney, Agent, or Firm* — DILWORTH IP, LLC

(57) ABSTRACT

The present disclosure relates to a chalcogenide glass composition and a lens including a molded article of the same, which are capable of guaranteeing excellent refractive index, Vickers hardness, and price competitiveness without including an element such as arsenic harmful to the human body.

9 Claims, 4 Drawing Sheets

(56) References Cited

FOREIGN PATENT DOCUMENTS

| | | | |
|---|---|---|---|
| KR | 10-2302281 | B1 | 9/2021 |
| KR | 10-2022-0083926 | A | 6/2022 |

OTHER PUBLICATIONS

Chinese Patent Application No. 202110099301.4, second Office Action dated Apr. 3, 2024, 7 pages.
Chinese Patent Application No. 202110099301.4, English translation of second Office Action dated Apr. 3, 2024, 11 pages.
Chinese Patent Application No. 202110099301.4, third Office Action dated Aug. 5, 2024, 7 pages.
Chinese Patent Application No. 202110099301.4, English translation of third Office Action dated Aug. 5, 2024, 11 pages.
Korean Patent Application No. 10-2023-7027191, Preliminary Office Action dated Jul. 16, 2024, 10 pages.
Korean Patent Application No. 10-2023-7027191, English translation of Preliminary Office Action dated Jul. 16, 2024, 12 pages.
European Patent Application No. 22742251.6, extended Search and Opinion dated Aug. 23, 2024, 7 pages.
Danto, Sylvain, et al; "A Family of Far-Infrared-Transmitting Glasses in the Ga—Ge—Te System for Space Applications"; Advanced Functional Material; 2006, 16, pp. 1847-1852; DOI: 10.1002/adfm.200500645.
Notice of Allowance received for Korean Application No. 10-2023-0107473, mailed on Mar. 25, 2025, 6 pages (3 pages of original office action and 3 pages of English Translation).

* cited by examiner

CHALCOGENIDE GLASS COMPOSITION INCLUDING SILICON, GALLIUM AND TELLURIUM, AND INFRARED TRANSMITTING LENS INCLUDING THE SAME

CROSS-REFERENCE OF RELATED APPLICATIONS

This application claims priority to and the benefit of Korean Patent Application Nos. 10-2022-0103454 and 10-2022-0110982, filed with the Korean Intellectual Property Office on Aug. 18, 2022, and Sep. 1, 2022, respectively, the contents of which are incorporated herein by reference in their entirety.

TECHNICAL FIELD

The present disclosure relates to chalcogenide glass compositions and infrared transmitting lens including the same.

BACKGROUND ART

A thermal imaging camera essentially includes an optical imaging system which detects the relative intensities of electromagnetic waves in an infrared wavelength range emitted or reflected from an object to realize the sensed intensities as a visual image. Since objects having different temperatures emit electromagnetic waves in different spectral forms according to the blackbody radiation law, temperature information along with shape information of each of the objects can be obtained without direct contact with the objects. The infrared wavelength range employed in a thermal imaging camera may be classified into near-infrared, mid-infrared, and long-wavelength infrared range capable of minimizing the effects of resonant vibration absorption and scattering of atmospheric constituent molecules. In this regard, in order to measure the body temperature of a human being or realize it as a thermal image, it is advantageous to employ an optical imaging system utilizing the long-wavelength infrared (LWIR; 8-12 μm) range, in which blackbody radiation peaks at around 10 μm in the case of blackbody radiation from a homoeothermic body.

LWIR cameras have been mainly used for special purposes such as night vision devices in the military field, and, however, recently, their application fields are gradually diversifying in the civilian industry, such as thermal imaging cameras being applied to night vision for cars, the construction business of artificial intelligence (AI) learning data centers for the realization of smart cities to be utilized for situation analysis of nighttime incidents/accidents in downtown areas, and the like as well as body temperature diagnosis, security, fire prevention, and a diagnostic tool for easy identification of insulation construction and energy loss. In addition, there has been an explosive increase in worldwide demands for non-contact thermometers and thermal imaging cameras for more effectively measuring body temperature for the purpose of preventing the spread of coronavirus infection. For theses thermal imaging cameras utilized in the civilian market, in terms of lens materials, chalcogenide glass is more promising than crystalline materials, as price competitiveness acts as a very important factor along with technologically superior products. Single-crystalline germanium (Ge), silicon (Si), and polycrystalline ZnSe which feature relatively good mechanical and optical properties have been utilized as the lens materials of conventional military thermal imaging cameras. However, cost for raw materials as well as cost for synthesis of such crystalline materials are high. In addition, refractive lenses made of those crystalline materials are manufactured through a direct machining process such as a diamond turning machining method. This machining process takes a lot of time and the process costs are high. Contrarily, the chalcogenide glass material is very suitable for mass-production, and can be applied as a flat meta-lens because it is possible to apply a wafer-level molding process that utilizes the unique viscoelastic flow characteristics of glass, and the chalcogenide glass material can be synthesized by a conventional melt-quenching method applied to the synthesis of glass materials, so it is cheaper in terms of production cost than conventional crystalline materials, thus advantageously enabling the response to high demands in the civilian industry. In addition to the price aspect described above, the optical/mechanical/thermal properties can be optimized in terms of the required performance of the optical system and the lens molding process through the control of the relative composition within the glass formation region by utilizing the inherent properties of glass materials, so that it is possible to flexibly respond to the configuration of various optical imaging systems.

Commercially available chalcogenide glass compositions that can be applied as refractive imaging lenses mainly include a ternary germanium-(arsenic (As) or antimony (Sb))-(sulfur or selenium or tellurium) composition and a binary arsenic-(sulfur or selenium) composition, and glass has been commonly selected that has a specific composition with which a molding process is applied because of its relatively high long-wavelength infrared range transmission property and thermal stability within the glass forming region. As described above, the commercially available chalcogenide glass compositions have been commercialized mainly focused on glass forming ability and moldability, so the refractive index and dispersion, which are the most important optical properties for the refractive imaging lens application, are confined to relatively narrow ranges. When the refractive index of the material is low, the sag of the refractive lens needs to become greater, so relatively large viscoelastic deformation is required in the lens forming process step, which leads to an increase in related process costs and an increase in an optical aberration such as a spherical aberration, adversely affecting the thermal image quality. Therefore, it is absolutely advantageous to use a glass material with a high refractive index, and in order to realize a price-competitive thermal imaging camera module for civilian use in the future, by improving the refractive index of the glass material, the amount of deformation in the lens forming process needs to be reduced and at the same time, the degree of freedom for the designs of the optical imaging systems with various specifications needs to be increased. Concurrently, it is necessary to manufacture refractive lenses through a wafer-level molding process that can increase mass productivity beyond the simple molding process currently applied, and furthermore, to manufacture flat-type lenses such as micro-lens arrays and meta-lenses. In addition, it becomes noticeable that commercially available chalcogenide glass materials including arsenic as a main component are likely to have very limited applications in the civilian sector in terms of environmental friendliness.

DISCLOSURE

Technical Problem

An object to be achieved by the present disclosure is to provide a chalcogenide glass composition and a lens using the same, which are devoid of elements harmful to the human body such as arsenic, and are capable of guaranteeing excellent refractive index, Vickers hardness, and price competitiveness.

However, the objects to be achieved by the present disclosure are not limited to the above-mentioned one, and other unmentioned objects will be clearly understood by those skilled in the art from the following description.

Technical Solution

An example of the present disclosure provides a chalcogenide glass composition including silicon (Si), gallium (Ga), and tellurium (Te), wherein with respect to the total elements, the content of the tellurium element is same to or greater than 65.0 at % but less than 85.0 at %.

In addition, another aspect of the present disclosure provides a lens including a molded article of the chalcogenide glass composition.

Advantageous Effects

The chalcogenide glass composition according to an embodiment of the present disclosure can exhibit excellent hardness.

Also, the chalcogenide glass composition according to an embodiment of the present disclosure can exhibit an excellent refractive index at a wavelength of 10 μm In addition, the chalcogenide glass composition according to an embodiment of the present disclosure can have excellent price competitiveness.

Additionally, the chalcogenide glass composition according to an embodiment of the present disclosure is devoid of arsenic, so it can be harmless to the human body.

The effects of the present disclosure are not limited to the aforementioned ones, but other unmentioned effects thereof will be clearly understood by those skilled in the art from the present specification and the accompanying drawings.

MODE FOR DISCLOSURE

Figure 1:
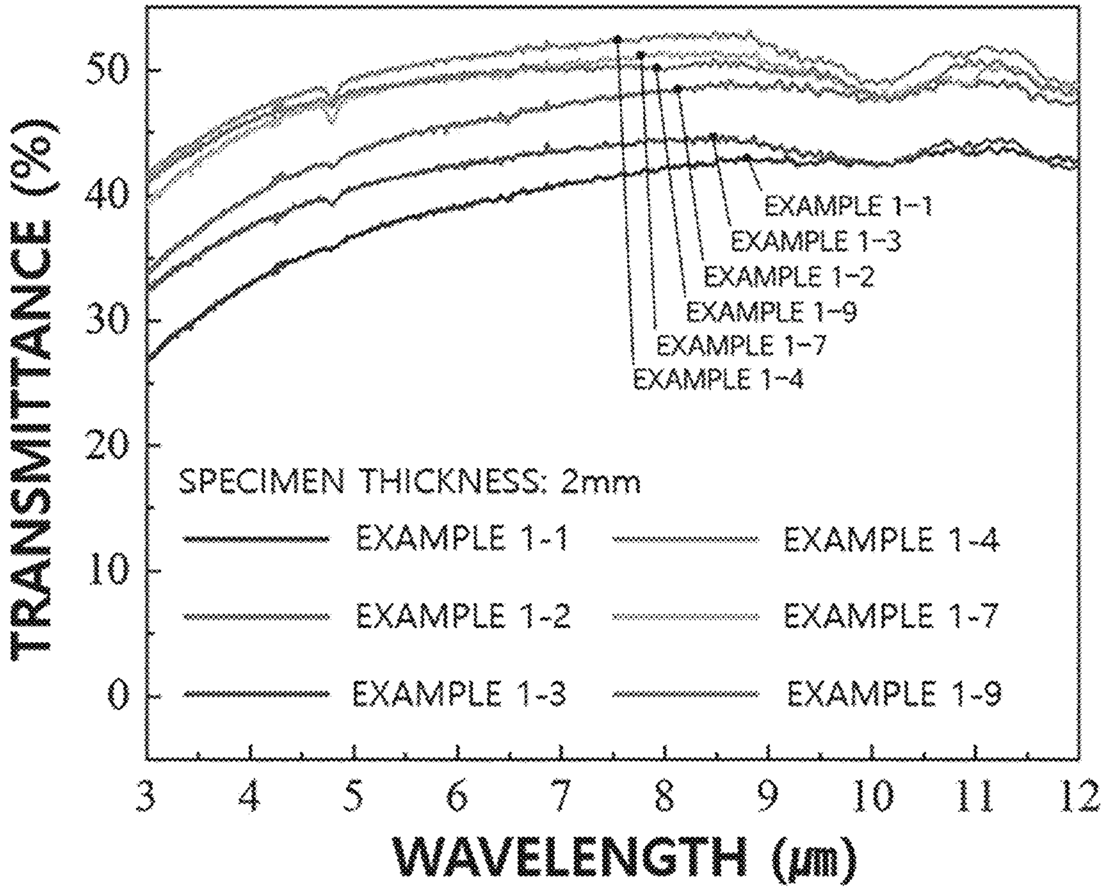
FIG. 1 shows the transmission spectra of Examples 1-1 to 1-4, Example 1-7, and Example 1-9.

Throughout the specification of the present application, when a part "includes" or "comprises" a component, it means not that the part excludes other component, but instead that the part may further include other component unless expressly stated to the contrary.

Hereinafter, the present invention will be described in more detail.

An embodiment of the present disclosure provides a chalcogenide glass composition including silicon (Si), gallium (Ga), and tellurium (Te).

According to an embodiment of the present disclosure, the content of the tellurium element may be 65.0 at % or more and less than 85.0 at %, 65.0 at % or more and 82.5 at % or less, 70.0 at % or more and less than 85.0 at %, 70.0 at % or more and 82.5 at % or less, 72.5 at % or more and less than 85.0 at %, 72.5 at % or more and 82.5 at % or less, 75.0 at % or more and less than 85.0 at %, or 75.0 at % or more and 82.5 at % or less with respect to the total elements.

According to an embodiment of the present disclosure, the content of the gallium element may be greater than 2.5 at % and less than 20.0 at %, or greater than 2.5 at % and less than or equal to 17.5 at %, preferably 5.0 at % or more and 17.5 at % or less, with respect to the total elements.

According to an embodiment of the present disclosure, the content of the silicon element may be greater than 2.5 at % and less than 17.5 at %, or 5.0 at % or more and less than 17.5 at %, preferably 5.0 at % or more and 15.0 at % or less, with respect to the total elements.

When the contents of tellurium, gallium, and silicon included in the chalcogenide glass composition are within the above-mentioned ranges, respectively, the chalcogenide glass composition can form stable bulk glass with excellent hardness, refractive index at a wavelength of 10 μm, and price competitiveness.

Specifically, since the chalcogenide glass composition of the present disclosure is devoid of germanium, it may have excellent price competitiveness compared to conventional commercially available compositions including germanium. Further, even though it is devoid of germanium, it can exhibit excellent hardness compared to commercially available compositions including germanium.

According to an embodiment of the present disclosure, the chalcogenide glass composition may further include one or more elements selected from the group consisting of germanium (Ge), selenium (Se), bismuth (Bi), indium (In), tin (Sn), antimony (Sb), aluminum (Al), and iodine (I).

According to an embodiment of the present disclosure, the content of the germanium element may be greater than 0 at % and less than 10.0 at %, or 0.5 at % or more and 8.0 at % or less, preferably 1.0 at % or more and 7.0 at % or less, with respect to the total elements.

According to an embodiment of the present disclosure, the content of the selenium element may be greater than 0 at % and less than 7.0 at %, or 0.5 at % or more and 6.0 at % or less, preferably 1.0 at % or more and 5.0 at % or less, with respect to the total elements. In this case, the content of silicon may be 12.0 at % or more and 15.0 at % or less.

According to an embodiment of the present disclosure, the content of the bismuth element may be greater than 0 at % and less than 3.0 at %, or 0.1 at % or more and 2.0 at % or less, preferably 0.5 at % or more and 1.5 at % or less, with respect to the total elements.

According to an embodiment of the present disclosure, the content of the indium element may be greater than 0 at % and less than 10.0 at %, or 0.5 at % or more and 8.0 at % or less, preferably 1.0 at % or more and 7.0 at % or less, or 1.0 at % or more and 5.0 at % or less, with respect to the total elements.

According to an embodiment of the present disclosure, the content of the tin element may be greater than 0 at % and less than 10.0 at %, or 0.5 at % or more and 8.0 at % or less, preferably 1.0 at % or more and 7.0 at % or less, or 1.0 at % or more and 3.0 at % or less, with respect to the total elements.

According to an embodiment of the present disclosure, the content of the antimony element may be greater than 0 at % and less than 9.0 at %, or 0.5 at % or more and 8.0 at % or less, preferably 1.0 at % or more and 7.0 at % or less, or 1.0 at % or more and 5.0 at % or less, with respect to the total elements. In this case, the content of silicon may be 8.0 at % or more and 14.0 at % or less.

According to an embodiment of the present disclosure, the content of the aluminum element may be greater than 0 at % and less than 10.0 at %, 1.0 at % or more and 9.0 at % or less, 2.0 at % or more and 8.0 at % or less, or 2.5 at % or more and 7.0 at % or less, preferably 3.0 at % or more and 6.0 at % or less, with respect to the total elements.

According to an embodiment of the present disclosure, the content of the iodine element may be greater than 0 at % and less than or equal to 15.0 at %, 0.1 at % or more and 13.0 at % or less, 0.5 at % or more and 11.0 at % or less, preferably, 1.0 at % or more and 10.0 at % or less, 7.5 at % or more and 12.5 at % or less, or 9.0 at % or more and 11.0 at % or less, with respect to the total elements.

When the contents of germanium, selenium, bismuth, indium, tin or antimony included in the chalcogenide glass composition are within the above-mentioned ranges, respectively, the chalcogenide glass composition can form stable bulk glass with excellent hardness, refractive index at a wavelength of 10 μm, and price competitiveness.

According to an embodiment of the present disclosure, the chalcogenide glass composition may have a glass transition temperature of 130° C. to 190° C. The chalcogenide glass composition having a glass transition temperature within the above-mentioned range can make the molding process easy and reduce the molding process cost. In the molding process, the glass transition temperature of the glass material can be assumed to be a very important factor when considering the mold material. That is, as the glass transition temperature becomes higher, the mold material should be selected from materials, such as tungsten carbide, silicon carbide, or others, which can maintain high mechanical strength at high temperatures, and however it is difficult to perform direct machining on these materials, which are expensive. On the other hand, as the glass transition temperature becomes lower, a stainless steel material or even a cheap polymer material such as PDMS can be used as a mold material, through which the process costs can be significantly reduced. Thus, the glass transition temperature range of the chalcogenide glass can advantageously lead to an increase in the freedom of selection of the mold material and a reduction in the thermal energy inputted to the molding process.

According to an embodiment of the present disclosure, the chalcogenide glass composition may have a thermal stability of 40° C. to 150° C., 45° C. to 150° C., or 50° C. to 150° C. The thermal stability may satisfy Equation 1 below.

$$\text{Thermal Stability } (\Delta T) = \text{Onset Temperature of Crystallization } (T_x) - \text{Glass Transition Temperature } (T_g) \quad \text{[Equation 1]}$$

When the chalcogenide glass composition has the thermal stability of the above-mentioned range, it may be suitable for a molding process. In general, the molding process is performed between the glass transition temperature and the onset temperature of crystallization. Here, as the difference between the onset temperature of crystallization and the glass transition temperature increases, the possibility that crystallization of the glass does not occur during the molding process increases.

According to an embodiment of the present disclosure, the chalcogenide glass composition may have a Vickers hardness ranging from 1.00 GPa to 1.35 GPa. The average coordination number for each composition was calculated under the assumption that the coordination numbers of the silicon atom and the gallium atom are commonly 4 and the coordination number of the tellurium atom is maintained at 2, and it can be seen that as the mean coordination number increases, the hardness tends to increase generally. Further, in contrast to the existing commercially available chalcogenide glasses mainly containing either toxic element like As or expensive element like Ge, this composition is devoid of those elements and, in addition, it was confirmed that it maintained the hardness at a level higher than or similar to that of the commercially available composition, and that it obtained a similar level of hardness compared to the Ge—Ga—Te ternary chalcogenide glass composition.

According to an embodiment of the present disclosure, the chalcogenide glass composition may have a refractive index of 3.25 or more, 3.15 or more, preferably 3.0 or more at a wavelength of 10 μm. It can be seen that the chalcogenide glass composition according to the present disclosure has excellent optical properties compared to the chalcogenide glass compositions with the existing commercially available composition having a refractive index of 2.4 to 2.8 at a wavelength of 10 μm.

The refractive index may be a measured refractive index or a calculated refractive index, wherein the calculated refractive index of the chalcogenide glass composition can be calculated by quantifying the atomic polarizability of the glass constituents and measuring the apparent density thereof, which will be described in detail later.

An embodiment of the present disclosure provides a lens including a molded article of the chalcogenide glass composition.

The lens may be a refractive lens or a diffractive lens.

Details mentioned in the chalcogenide glass composition and lens of the present disclosure are equally applied to each other unless it causes the contradiction.

According to an embodiment of the present disclosure, the lens including a molded article of the chalcogenide glass composition may be a lens for use in a LWIR camera. As described above, the chalcogenide glass composition can have excellent hardness, refractive index at a wavelength of 10 μm, and price competitiveness. Additionally, the chalcogenide glass composition has physical properties suitable for a wafer-level molding process or a imprinting process, so that a lens for use in a LWIR camera can be easily manufactured using the chalcogenide glass composition. Thus, the lens can be used for a thermal imaging camera utilizing infrared wavelengths.

According to an embodiment of the present disclosure, the molded article may be formed by performing a direct machining process, a molding process, a dry/wet etching process, a wafer-level molding process, or a imprinting process on the chalcogenide glass composition. That is, the lens may be manufactured by molding the chalcogenide glass composition through the direct machining process, the molding process, the dry/wet etching process, the wafer-level molding process, or the imprinting process. Specifically, the lens may be manufactured by molding the chalcogenide glass composition through the wafer-level molding process or the imprinting process.

Silicon, gallium, and tellurium used in the method for manufacturing a chalcogenide glass composition according to an embodiment of the present disclosure are as described in the chalcogenide glass composition.

When the process temperature is adjusted in the method for manufacturing a chalcogenide glass composition according to an embodiment of the present disclosure, impurity absorption (Si—O impurity vibration absorption) that may occur in the 11 μm can be effectively reduced.

Hereinafter, the present disclosure will be described specifically with reference to examples. However, it should be noted that the examples according to the present disclosure may be modified into various other forms, and the scope of the present disclosure is not construed as being limited to the examples to be described below. The examples of the present specification are provided to more completely explain the present disclosure to those of ordinary skill in the art.

Manufacturing of Example 1-1

Manufacturing of Glass Specimens

All specimens of the present disclosure were manufactured by a typical melt-quenching method applied to the synthesis of chalcogenide glass. The glass specimen of each composition is a circular rod, commonly 10 mm in diameter, and 6 cm or more in length.

After washing with acetone as a pretreatment process to remove possible contaminants present in the silica ampoule, heat treatment was performed at 600° C. for 3 hours or more. In a glove box filled with argon gas, starting materials were weighed in a composition of 5 at % silicon, 15 at % gallium, and 80 at % tellurium, and then charged into a silica ampoule, which was melted and sealed while maintaining its inside in a vacuum state. After that, the sealed silica ampoule was heated to 1000° C. at a rate of 100° C./hr through a locking electric furnace and its temperature was maintained for 12 hours or more, and was lowered to 600° C. and maintained for 2 hours, then it was quenched in the air for 1 hour or more. Afterwards, an annealing process was performed to minimize thermal stress inside the specimen and improve homogeneity, wherein the annealing temperature was maintained at a temperature generally 20° C. lower than the glass transition temperature for 3 hours, and then was furnace cooled.

Experimental Example 1. Bulk Glass Formation Evaluation

With respect to the manufactured glass specimen, an XRD pattern was analyzed and long-wavelength infrared range transmission spectrum was measured using FT-IR equipment to determine whether or not bulk glass was formed in the glass specimen. Specifically, first, by using XRD equipment (Ultima IV, Rigaku Co.), the XRD pattern of the glass specimen was analyzed to check whether a crystallization peak was generated. After that, by using FT-IR equipment (Spectrum 100, PerkinElmer Co.), the long-wavelength infrared range transmission spectrum of the glass specimen was measured, and when the transmittance was less than 10%, it was evaluated that bulk glass was not formed, and the results are shown in Table 1 below (Good: bulk glass was formed, Moderate: bulk glass was formed but low transmittance was obtained, Bad: bulk glass was not formed).

Manufacturing of Examples 1-2 to 1-11

Examples 1-2 to 1-11 were manufactured in the same manner as the glass specimen manufacturing method of Example 1-1 above, with the exception that the starting materials were adjusted to the composition of silicon, gallium and tellurium shown in Table 1 below. Additionally, bulk glass formation evaluation was performed in the same manner as in Experimental Example 1 above, and the results are shown in Table 1 below.

TABLE 1

| | Si (at %) | Ga (at %) | Te (at % ) | Quality of glass formation |
|---|---|---|---|---|
| EXAMPLE 1-1 | 5 | 15 | 80 | Good |
| EXAMPLE 1-2 | 7.5 | 12.5 | 80 | Good |
| EXAMPLE 1-3 | 10 | 10 | 80 | Good |
| EXAMPLE 1-4 | 12.5 | 7.5 | 80 | Good |
| EXAMPLE 1-5 | 15 | 5 | 80 | Good |
| EXAMPLE 1-6 | 7.5 | 17.5 | 75 | Moderate |
| EXAMPLE 1-7 | 10 | 15 | 75 | Good |
| EXAMPLE 1-8 | 12.5 | 12.5 | 75 | Good |
| EXAMPLE 1-9 | 15 | 10 | 75 | Good |
| EXAMPLE 1-10 | 7.5 | 10 | 82.5 | Good |
| EXAMPLE 1-11 | 10 | 7.5 | 82.5 | Good |

Manufacturing of Comparative Example 1-1

Comparative Example 1-1 was manufactured in the same manner as the glass specimen manufacturing method of Example 1-1 above, with the exception that the starting materials were adjusted to the composition of silicon, gallium and tellurium shown in Table 2 below. Additionally, bulk glass formation evaluation was performed in the same manner as in Experimental Example 1 above, and the results are shown in Table 2 below.

TABLE 2

| | Si (at %) | Ga (at %) | Te (at %) | Quality of glass formation |
|---|---|---|---|---|
| Comparative Example 1-1 | 20 | 5 | 75 | Bad |

Referring to Comparative Example 1-1 in Table 2, it can be seen that bulk glass is not formed when the composition of the present disclosure is not satisfied even though all of silicon, gallium and tellurium of the present disclosure are included.

Experimental Example 2. Thermal Stability Evaluation

In order to evaluate the thermal stability (ΔT) of the manufactured glass specimen, the glass transition temperature ($T_g$) and the onset temperature of crystallization ($T_x$) of the specimen were measured.

Specifically, DSC thermal analysis was performed using a DSC thermal analysis device (Exstar 6000, Seiko Co.). At this time, the temperature increase rate at the time of measurement was set to 10° C./min. The thermal stability (ΔT) was calculated through Equation 1 below by using the measured glass transition temperature and the onset temperature of crystallization, and the results are shown in Table 3 below.

Thermal Stability ($\Delta T$)=Onset Temperature of Crystallization ($T_x$)−Glass Transition Temperature ($T_g$) [Equation 1]

Experimental Example 3. Refractive Index Evaluation

The refractive index of the manufactured glass specimen was measured in the wavelength range of 2 μm to 15 μm using Ellipsometer equipment (IR-VASE Mark II, J. A. Woollam Co.), or the refractive index of the glass specimen was calculated by a method described below.

Specifically, the refractive index is affected by the atomic polarizability of the glass constituents and atomic packing ratio per unit volume of the glass, and was calculated through Equation 2 (a semi-experimental equation) based on the Clausius-Mossotti model, and the results are shown in Table 3 below.

$$n^2 = \frac{2R_m + (M/\rho)}{(M/\rho) - R_m} \quad \text{[Equation 2]}$$

In Equation 2, n denotes the refractive index, $R_m$ denotes the molar refractivity, M denotes the molar mass, and ρ denotes the density.

Experimental Example 4. Vickers Hardness Measurement

With respect to the manufactured glass specimens, Vickers hardness was measured using a Vickers hardness tester, and the results are shown in Table 3 below.

TABLE 3

| | Density ($g/cm^3$) | Calculated refractive index at 10 μm $n_{10(cal)}$ | Glass transition temperature (° C.) | Onset temperature of crystallization (° C.) | Thermal stability ΔT (° C.) | Vickers hardness (GPa) |
|---|---|---|---|---|---|---|
| EXAMPLE 1-1 | 5.4602 | 3.39 | 139.6 | 194.5 | 54.9 | 1.19 |
| EXAMPLE 1-2 | 5.4490 | 3.45 | 142.7 | 204.9 | 62.2 | 1.22 |
| EXAMPLE 1-3 | 5.3759 | 3.42 | 144.0 | 205.5 | 61.5 | 1.13 |
| EXAMPLE 1-4 | 5.2994 | 3.39 | 147.3 | 220.7 | 73.4 | 1.15 |
| EXAMPLE 1-5 | 5.2309 | 3.37 | 151.3 | 228.4 | 77.1 | 1.05 |
| EXAMPLE 1-6 | 5.6008 | 3.65 | 181.5 | 252.7 | 71.2 | 1.07 |
| EXAMPLE 1-7 | 5.2987 | 3.31 | 181. 2 | 259.8 | 78.6 | 1.22 |
| EXAMPLE 1-8 | 5.2346 | 3.30 | 186.0 | 331.3 | 145.3 | 1.28 |
| EXAMPLE 1-9 | 5.1485 | 3.26 | 189.4 | 331 | 141.6 | 1.28 |
| EXAMPLE 1-10 | 5.3827 | 3.37 | 131.2 | 190.4 | 59.2 | 1.18 |
| EXAMPLE 1-11 | 5.3201 | 3.35 | 133.5 | 197.4 | 63.9 | 1.09 |

Manufacturing of Comparative Examples 2-1 to 2-10

Comparative Examples 2-1 to 2-5 and Comparative Examples 2-7 to 2-10 were manufactured in the same manner as the glass specimen manufacturing method of Example 1-1 above, with the exception that the starting materials were adjusted to the composition of germanium (Ge), gallium (Ga), and tellurium (Te) shown in Table 4 below. Additionally, bulk glass formation evaluation, thermal stability evaluation, refractive index calculation, and Vickers hardness measurement were performed in the same manner as in Experimental Examples 1 to 4 above, and the results are shown in Table 4 below. Comparative Example 2-6 referred to S. Danto, et al., Adv. Funct. Mater. 19 (2006) 1847.

TABLE 4

| | Ge (at %) | Ga (at %) | Te (at %) | Glass transition temperature (° C.) | Thermal stability ΔT (° C.) | Vickers hardness (GPa) | Refractive index measured at 10 μm $n_{10(cal)}$ |
|---|---|---|---|---|---|---|---|
| Comparative Example 2-1 | 17.5 | 2.5 | 80 | 139.6 | 54.9 | 1.14 | 3.46 |
| Comparative Example 2-2 | 17.5 | 5 | 77.5 | 142.7 | 62.2 | 1.20 | 3.44 |
| Comparative Example 2-3 | 17.5 | 7.5 | 75 | 144.0 | 61.5 | 1.27 | 3.41 |

TABLE 4-continued

| | Ge (at %) | Ga (at %) | Te (at %) | Glass transition temperature (° C.) | Thermal stability ΔT (° C.) | Vickers hardness (GPa) | Refractive index measured at 10 μm $n_{10(cal)}$ |
|---|---|---|---|---|---|---|---|
| Comparative Example 2-4 | 15 | 5 | 80 | 147.3 | 73.4 | 1.17 | 3.47 |
| Comparative Example 2-5 | 15 | 7.5 | 77.5 | 151.3 | 77.1 | 1.27 | 3.44 |
| Comparative Example 2-6 | 15 | 10 | 75 | 181.5 | 71.2 | 1.33 | — |
| Comparative Example 2-7 | 15 | 12.5 | 72.5 | 181. 2 | 78.6 | 1.41 | 3.40 |
| Comparative Example 2-8 | 12.5 | 7.5 | 80 | 186.0 | 145.3 | 1.23 | 3.49 |
| Comparative Example 2-9 | 12.5 | 10 | 77.5 | 189.4 | 141.6 | 1.36 | 3.45 |
| Comparative Example 2-10 | 12.5 | 12.5 | 75 | 131. 2 | 59.2 | 1.45 | 3.39 |

Referring to Table 3 and Table 4, it is confirmed that the chalcogenide glass composition including silicon, gallium and tellurium of the present disclosure has a similar level of hardness compared to the Ge—Ga—Te ternary chalcogenide glass composition.

Comparative Examples 3-1 to 3-11

The composition, refractive index and Vickers hardness of currently commercially available chalcogenide glass are shown in Table 5 below.

TABLE 5

| | Commercially available name | Chalcogenide composition | Refractive index measured at 10 μm $n_{10\ (mea)}$ | Vickers hardness (GPa) |
|---|---|---|---|---|
| Comparative Example 3-1 | AMTIR-4 | $As_{28}Se_{72}$ | 2.6460 | 0.72 |
| Comparative Example 3-2 | AMTIR-5 | $As_{34}S_{66}$ | 2.7423 | 0.75 |
| Comparative Example 3-3 | AMTIR-7 | As—Se* | 2.6893 | 0.74 |
| Comparative Example 3-4 | IRG22 | $Ge_{33}As_{12}Se_{55}$ | 2.4968 | 1.31 |
| Comparative Example 3-5 | IRG24 | $Ge_{10}As_{40}Se_{50}$ | 2.6090 | 1.02 |
| Comparative Example 3-6 | IRG25 | $Ge_{28}Sb_{12}Se_{60}$ | 2.6030 | 1.03 |
| Comparative Example 3-7 | IRG26 | $As_{40}Se_{60}$ | 2.7781 | 0.94 |
| Comparative Example 3-8 | IRG27 | $As_{33}S_{67}$ | 2.3842 | 1.01 |
| Comparative Example 3-9 | IRG203 | $Ge_{20}Sb_{15}Se_{65}$ | 2.5837 (10.6 μm) | 1.24 |
| Comparative Example 3-10 | IRG204 | $Sb_4As_{30}Sn_3Se_{63}$ | 2.7659 (10.6 μm) | 1.03 |
| Comparative Example 3-11 | IG-3 | $Ge_{30}Sb_{13}Se_{32}Te_{25}$ | 2.7870 | 1.26 |

*Specific composition unknown

Referring to Tables 3 and 5, the chalcogenide glass composition including silicon, gallium, and tellurium of the present disclosure has a hardness higher than or similar to that of the chalcogenide glass compositions with the existing commercially available composition. Additionally, it can be seen that the chalcogenide glass composition of the present disclosure has an excellent refractive index of 3.0 or more at a wavelength of 10 μm, compared to the chalcogenide glass compositions with the existing commercially available composition having a refractive index of 2.4 to 2.8 at a wavelength of 10 μm.

Experimental Example 5. Transmission Spectrum Measurement

Figure 2:
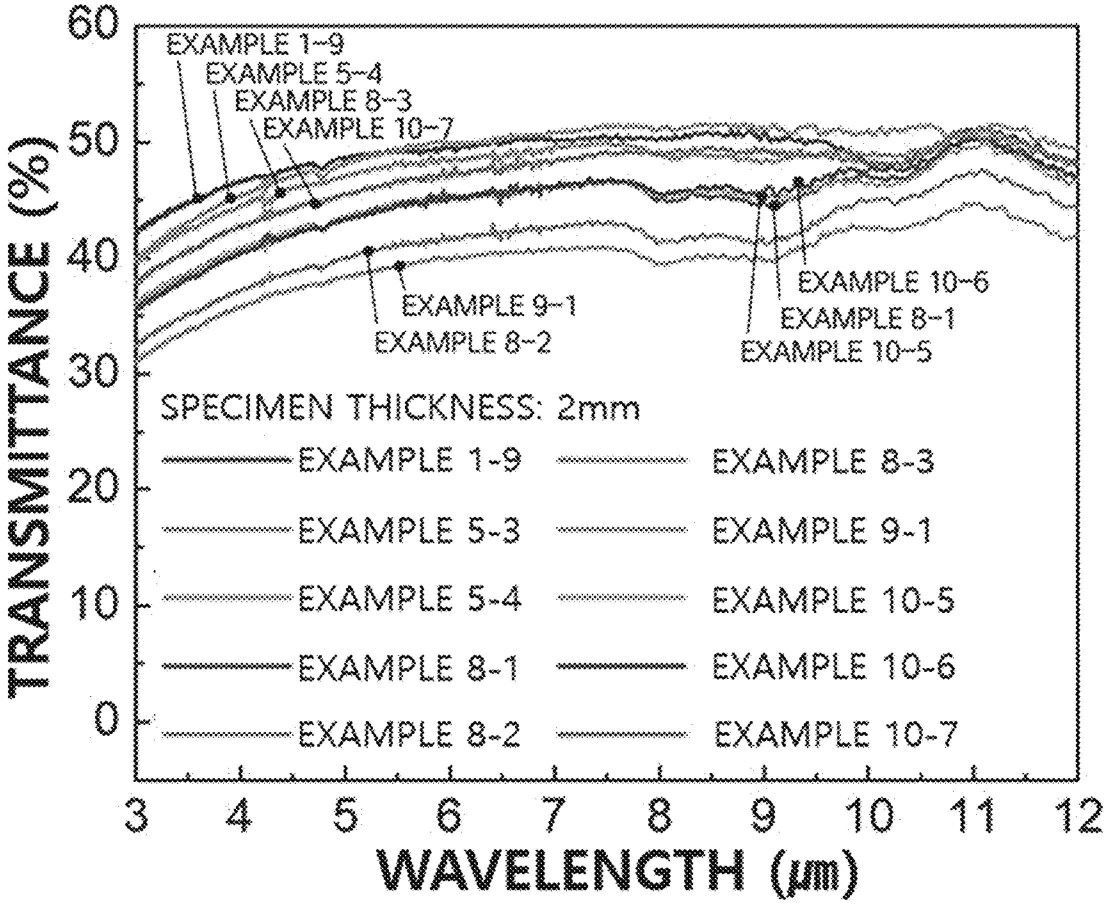
FIG. 2 shows the transmission spectra of Example 1-9, Example 5-3, Example 5-4, Examples 8-1 to 8-3, Example 9-1, and Examples 10-5 to 10-7.

The glass specimens manufactured in Examples 1-1 to 1-4, Examples 1-7, Examples 1-9, Examples 5-3 and 5-4, Examples 8-1 to 8-3, Example 9-1, and Examples 10-5 to 10-7 were polished to a thickness of 2 mm, and transmission spectra thereof were measured in a wavelength range of 3 μm to 12 μm using FT-IR (Spectrum 100, PerkinElmer) equipment, and the results are shown in FIGS. 1 and 2 below.

Referring to FIG. 1, it can be seen that Examples 1-1 to 1-4, Examples 1-7 and 1-9 exhibit good transmittance in the wavelength range of 8 to 12 μm used in a long-wavelength infrared range thermal imaging camera.

Referring to FIG. 2, it can be seen that Examples 5-3 and 5-4, Examples 8-1 to 8-3, Example 9-1, and Examples 10-5 to 10-7 exhibit good transmittance in the wavelength range of 8 to 12 μm used in a long-wavelength infrared range thermal imaging camera.

Manufacturing of Examples 4-1 and 4-2

As shown in Table 6 below, Examples 4-1 and 4-2 were manufactured in the same manner as the glass specimen manufacturing method of Example 1-5 above, with the exception that the process temperature was adjusted to 600° C. or 800° C.

TABLE 6

| | Si (at %) | Ga (at %) | Te (at %) | Process temperature (° C.) |
|---|---|---|---|---|
| EXAMPLE 1-5 | 15 | 5 | 80 | 1000 |
| EXAMPLE 4-1 | 15 | 5 | 80 | 600 |
| EXAMPLE 4-2 | 15 | 5 | 80 | 800 |

Manufacturing of Examples 5-1 to 5-4 and Comparative Example 5-1

A glass specimen further including germanium (Ge) in addition to silicon (Si), gallium (Ga), and tellurium (Te) was manufactured. Specifically, Examples 5-1 to 5-4 and Comparative Example 5-1 were manufactured in the same manner as the glass specimen manufacturing method of Example 1-1 above, with the exception that the starting materials were adjusted to the composition of silicon (Si), gallium (Ga), tellurium (Te), and germanium (Ge) shown in Table 7 below. Additionally, bulk glass formation evaluation, thermal stability evaluation, refractive index calculation, and Vickers hardness measurement were performed in the same manner as in Experimental Examples 1 to 4 above, and the results are shown in Table 7 below.

TABLE 7

| | Si (at %) | Ga (at %) | Te (at %) | Ge (at %) | Quality of glass formation | Glass transition temperature (° C.) | Thermal stability ΔT (° C.) | Vickers hardness (GPa) | Calculated refractive index at 10 μm $n_{10(cal)}$ |
|---|---|---|---|---|---|---|---|---|---|
| EXAMPLE 5-1 | 14 | 10 | 75 | 1 | Good | 177.9 | 144.4 | 1.10 | 3.36 |
| EXAMPLE 5-2 | 12 | 10 | 75 | 3 | Good | 172. 2 | 79.8 | 1.13 | 3.40 |
| EXAMPLE 5-3 | 10 | 10 | 75 | 5 | Good | 180.8 | 131.3 | 1.16 | 3.32 |
| EXAMPLE 5-4 | 8 | 10 | 75 | 7 | Good | 179.1 | 119.6 | 1.18 | 3.33 |
| Comparative Example 5-1 | 25 | 25 | 27.5 | 22.5 | Bad | — | — | — | — |

Experimental Example 6. Measurement of Transmission Spectrum Change According to Process Temperature As in the transmission spectrum measurement method of Experimental Example 5, the transmission spectrum was measured by adjusting the thickness of the glass specimens of Example 1-5, and Examples 4-1 and 4-2 having the above-described composition to 2 mm.

It can be seen that the size of the Si—O impurity absorption peak occurring in the 11 μm band decreases as the process temperature decreases. In particular, when the process is performed at 600° C., the absorption peak at 11 μm is removed, which can be confirmed by the fact that as the process temperature is lowered, the inflow of impurities from the ampoule is reduced and the reduction of Si—O absorption is induced, and it can be utilized to reduce impurity absorption when a silica ampoule is adopted and a highly reactive element are included in the glass batch.

Referring to Table 7, it can be seen that when the content of the germanium element is 1.0 at % or more and 7.0 at % or less with respect to the total elements, the chalcogenide glass composition further including germanium of the present disclosure can form a stable bulk glass with excellent thermal stability, hardness and refractive index at a wavelength of 10 μm.

Manufacturing of Examples 6-1 to 6-5 and Comparative Examples 6-1 to 6-3

A glass specimen further including selenium (Se) in addition to silicon (Si), gallium (Ga), and tellurium (Te) was manufactured. Specifically, Examples 6-1 to 6-5 and Comparative Examples 6-1 to 6-3 were manufactured in the same manner as the glass specimen manufacturing method of Example 1-1 above, with the exception that the starting materials were adjusted to the composition of silicon (Si), gallium (Ga), tellurium (Te), and selenium (Se) shown in Table 8 below. Additionally, bulk glass formation evaluation, thermal stability evaluation, refractive index calculation, and Vickers hardness measurement were performed in the same manner as in Experimental Examples 1 to 4 above, and the results are shown in Table 8 below.

TABLE 8

| | Si (at %) | Ga (at %) | Te (at %) | Se (at %) | Quality of glass formation | Glass transition temperature (° C.) | Thermal stability ΔT (° C.) | Vickers hardness (GPa) | Calculated refractive index at 10 μm $n_{10(cal)}$ |
|---|---|---|---|---|---|---|---|---|---|
| EXAMPLE 6-1 | 14 | 10 | 75 | 1 | Good | 185.3 | 150.5 | 1.08 | 3.20 |
| EXAMPLE 6-2 | 12 | 10 | 75 | 3 | Good | 188.5 | 22.2 | 1.06 | 3.17 |
| EXAMPLE 6-3 | 15 | 10 | 74 | 1 | Good | 179.7 | 63.9 | 1.25 | 3.29 |
| EXAMPLE 6-4 | 15 | 10 | 72 | 3 | Good | 160.9 | 73.4 | 1.19 | 3.32 |
| EXAMPLE 6-5 | 15 | 10 | 70 | 5 | Good | 141.7 | 65.7 | 1.13 | 3.34 |
| Comparative Example 6-1 | 10 | 10 | 75 | 5 | Bad | — | — | — | — |
| Comparative Example 6-2 | 8 | 10 | 75 | 7 | Bad | — | — | — | — |
| Comparative Example 6-3 | 15 | 10 | 68 | 7 | Bad | — | — | — | — |

Referring to Table 8, it can be seen that when the content of the selenium element is 1.0 at % or more and 5.0 at % or less and the silicon content is 12.0 at % or more and 15.0 at % or less, with respect to the total element, the chalcogenide glass composition further including selenium of the present disclosure can form a stable bulk glass with excellent thermal stability, hardness and refractive index at a wavelength of 10 μm.

Manufacturing of Example 7-1 and Comparative Examples 7-1 to 7-3

A glass specimen further including bismuth (Bi) in addition to silicon (Si), gallium (Ga), and tellurium (Te) was manufactured. Specifically, Examples 7-1 and Comparative Examples 7-1 to 7-3 were manufactured in the same manner as the glass specimen manufacturing method of Example 1-1 above, with the exception that the starting materials were adjusted to the composition of silicon (Si), gallium (Ga), tellurium (Te), and bismuth (Bi) shown in Table 9 below. Additionally, bulk glass formation evaluation, thermal stability evaluation, refractive index calculation, and Vickers hardness measurement were performed in the same manner as in Experimental Examples 1 to 4 above, and the results are shown in Table 9 below.

TABLE 9

| | Si (at %) | Ga (at %) | Te (at %) | Bi (at %) | Quality of glass formation | Glass transition temperature (° C.) | Thermal stability ΔT (° C.) | Vickers hardness (GPa) | Calculated refractive index at 10 μm $n_{10(cal)}$ |
|---|---|---|---|---|---|---|---|---|---|
| EXAMPLE 7-1 | 14 | 10 | 75 | 1 | Good | 180.7 | 117.6 | 1.22 | 3.34 |
| Comparative Example 7-1 | 12 | 10 | 75 | 3 | Bad | — | — | — | — |
| Comparative Example 7-2 | 10 | 10 | 75 | 5 | Bad | — | — | — | — |
| Comparative Example 7-3 | 8 | 10 | 75 | 7 | Bad | — | — | — | — |

Referring to Table 9, it can be seen that when the content of the bismuth element is 0.5 at % or more and 1.5 at % or less with respect to the total elements, the chalcogenide glass composition further including bismuth of the present disclosure can form a stable bulk glass with excellent thermal stability, hardness and refractive index at a wavelength of 10 μm.

Manufacturing of Examples 8-1 to 8-4

A glass specimen further including indium (In) in addition to silicon (Si), gallium (Ga), and tellurium (Te) was manufactured. Specifically, Examples 8-1 to 8-4 were manufactured in the same manner as the glass specimen manufacturing method of Example 1-1 above, with the exception that the starting materials were adjusted to the composition of silicon (Si), gallium (Ga), tellurium (Te), and indium (In) shown in Table 10 below. Additionally, bulk glass formation evaluation, thermal stability evaluation, refractive index calculation, and Vickers hardness measurement were performed in the same manner as in Experimental Examples 1 to 4 above, and the results are shown in Table 10 below.

TABLE 10

| | Si (at %) | Ga (at %) | Te (at %) | In (at %) | Quality of glass formation | Glass transition temperature (° C.) | Thermal stability ΔT (° C.) | Vickers hardness (GPa) | Density ρ (g/cm³) |
|---|---|---|---|---|---|---|---|---|---|
| EXAMPLE 8-1 | 14 | 10 | 75 | 1 | Good | 185.5 | 157.9 | 1.30 | 5.2076 |
| EXAMPLE 8-2 | 12 | 10 | 75 | 3 | Good | 181.5 | 147.4 | 1.36 | 5.2655 |
| EXAMPLE 8-3 | 10 | 10 | 75 | 5 | Good | 175.9 | 129.7 | 1.31 | 5.3707 |
| EXAMPLE 8-4 | 8 | 10 | 75 | 7 | Moderate | 169.3 | 66.7 | 1.18 | 5.4863 |

Referring to Table 10, it can be seen that when the content of the indium element is 1.0 at % or more and 7.0 at % or less with respect to the total elements, the chalcogenide glass composition further including indium of the present disclosure can form a stable bulk glass with excellent thermal stability, hardness and refractive index at a wavelength of 10 μm.

Manufacturing of Examples 9-1 to 9-4

A glass specimen further including tin (Sn) in addition to silicon (Si), gallium (Ga), and tellurium (Te) was manufactured. Specifically, Examples 9-1 to 9-4 were manufactured in the same manner as the glass specimen manufacturing method of Example 1-1 above, with the exception that the starting materials were adjusted to the composition of silicon (Si), gallium (Ga), tellurium (Te), and tin (Sn) shown in Table 11 below. Additionally, bulk glass formation evaluation, thermal stability evaluation, refractive index calculation, and Vickers hardness measurement were performed in the same manner as in Experimental Examples 1 to 4 above, and the results are shown in Table 11 below.

TABLE 11

| | Si (at %) | Ga (at %) | Te (at %) | Sn (at %) | Quality of glass formation | Glass transition temperature | Thermal stability ΔT (° C.) | Vickers hardness (GPa) | Calculated refractive index at 10 μm $n_{10(cal)}$ |
|---|---|---|---|---|---|---|---|---|---|
| EXAMPLE 9-1 | 14 | 10 | 75 | 1 | Good | 187.7 | 40.2 | 1.25 | 3.31 |
| EXAMPLE 9-2 | 12 | 10 | 75 | 3 | Good | 177.4 | 71.7 | 1.25 | 3.37 |
| EXAMPLE 9-3 | 10 | 10 | 75 | 5 | Moderate | 163.7 | 59.7 | 1.23 | 3.41 |
| EXAMPLE 9-4 | 8 | 10 | 75 | 7 | Moderate | 152.4 | 50.5 | 1.17 | 3.48 |

Referring to Table 11, it can be seen that when the content of the tin element is 1.0 at % or more and 7.0 at % or less with respect to the total elements, the chalcogenide glass composition further including tin of the present disclosure can form a stable bulk glass with excellent thermal stability, hardness and refractive index at a wavelength of 10 μm.

Manufacturing of Examples 10-1 to 10-8 and Comparative Examples 10-1 to 10-8

A glass specimen further including antimony (Sb) in addition to silicon (Si), gallium (Ga), and tellurium (Te) was manufactured. Specifically, Examples 10-1 to 10-8 and Comparative Examples 10-1 to 10-8 were manufactured in the same manner as the glass specimen manufacturing method of Example 1-1 above, with the exception that the starting materials were adjusted to the composition of silicon (Si), gallium (Ga), tellurium (Te), and antimony (Sb) shown in Table 12 below. Additionally, bulk glass formation evaluation, thermal stability evaluation, refractive index calculation, and Vickers hardness measurement were performed in the same manner as in Experimental Examples 1 to 4 above, and the results are shown in Table 12 below.

TABLE 12

| | Si (at %) | Ga (at %) | Te (at %) | Sb (at %) | Quality of glass formation | Glass transition temperature (° C.) | Thermal stability ΔT (° C.) | Vickers hardness (GPa) | Calculated refractive index at 10 μm $n_{10(cal)}$ |
|---|---|---|---|---|---|---|---|---|---|
| EXAMPLE 10-1 | 11.5 | 7.5 | 80 | 1 | Good | 175.9 | 139 | 1.23 | 3.18 |
| EXAMPLE 10-2 | 9.5 | 7.5 | 80 | 3 | Good | 141. 2 | 56.3 | 1.13 | 3.50 |
| EXAMPLE 10-3 | 9 | 15 | 75 | 1 | Good | 182.9 | 69.97 | 1.27 | 3.35 |
| EXAMPLE 10-4 | 7 | 15 | 75 | 3 | Good | 171.9 | 105.8 | 1.33 | 3.44 |
| EXAMPLE 10-5 | 14 | 10 | 75 | 1 | Good | 182.1 | 51 | 1.05 | 3.31 |
| EXAMPLE 10-6 | 12 | 10 | 75 | 3 | Good | 167.8 | 68 | 1.05 | 3.37 |
| EXAMPLE 10-7 | 10 | 10 | 75 | 5 | Good | 156.3 | 73.5 | 1.04 | 3.48 |
| EXAMPLE 10-8 | 8 | 10 | 75 | 7 | Moderate | 147.1 | 67.8 | 1.01 | 3.52 |
| Comparative Example 10-1 | 4 | 15 | 80 | 1 | Bad | — | — | — | — |
| Comparative Example 10-2 | 2 | 15 | 80 | 3 | Bad | — | — | — | — |
| Comparative Example 10-3 | 0 | 15 | 80 | 5 | Bad | — | — | — | — |
| Comparative Example 10-4 | 7.5 | 7.5 | 80 | 5 | Bad | — | — | — | — |
| Comparative Example 10-5 | 5.5 | 7.5 | 80 | 7 | Bad | — | — | — | — |
| Comparative Example 10-6 | 5 | 15 | 75 | 5 | Bad | — | — | — | — |
| Comparative Example 10-7 | 3 | 15 | 75 | 7 | Bad | — | — | — | — |
| Comparative Example 10-8 | 6.5 | 10 | 82.5 | 1 | Bad | — | — | — | — |

Referring to Table 12, it can be seen that when the content of the antimony element is 1.0 at % or more and 7.0 at % or less and the silicon content is 8.0 at % or more and 14.0 at % or less, with respect to the total element, the chalcogenide glass composition further including antimony of the present disclosure can form a stable bulk glass with excellent thermal stability, hardness and refractive index at a wavelength of 10 μm.

Examples 11-1 and 11-2

A glass specimen further including aluminum (Al) in addition to silicon (Si), gallium (Ga), and tellurium (Te) was manufactured. Specifically, Examples 11-1 and 11-2 were manufactured in the same manner as the glass specimen manufacturing method of Example 1-1 above, with the exception that the starting materials were adjusted to the composition of silicon (Si), gallium (Ga), tellurium (Te), and aluminum (Al) shown in Table 13 below. Additionally, bulk glass formation evaluation, thermal stability evaluation, refractive index calculation, Vickers hardness measurement, and transmission spectrum measurement were performed in the same manner as in Experimental Examples 1 to 5 above, and the results are shown in Table 13 and FIG. 3 below.

TABLE 13

| | Si (at %) | Ga (at %) | Te (at %) | Al (at %) | Quality of glass formation | Glass transition temperature (° C.) | Thermal stability ΔT (° C.) | Vickers hardness (GPa) |
|---|---|---|---|---|---|---|---|---|
| EXAMPLE 11-1 | 15 | 7 | 75 | 3 | Good | 186.3 | 49.3 | 1.25 |
| EXAMPLE 11-2 | 15 | 4 | 75 | 6 | Good | 182.8 | 53.5 | 1.08 |

Referring to Table 13, it can be seen that when the content of the aluminum element is 3.0 at % or more and 6.0 at % or less with respect to the total elements, the chalcogenide glass composition further including aluminum of the present disclosure can form a stable bulk glass with excellent thermal stability, hardness and refractive index at a wavelength of 10 μm.

Figure 3:
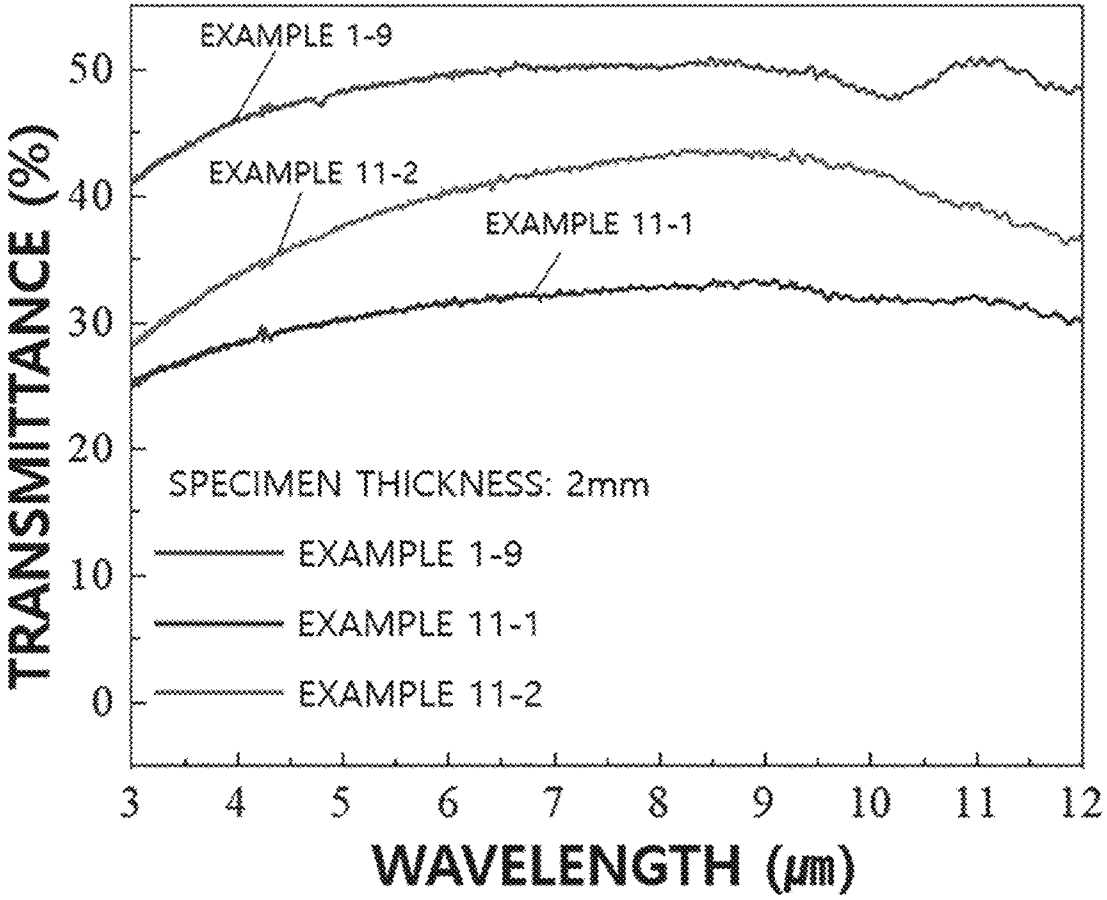
FIG. 3 shows the transmission spectra of Example 11-1 and Example 11-2.

Additionally, referring to FIG. 3, it can be seen that Examples 11-1 and 11-2 exhibit good transmittance in the wavelength range of 8 to 12 μm used in a long-wavelength infrared range thermal imaging camera.

Examples 12-1 to 12-3

A glass specimen further including iodine (I) in addition to silicon (Si), gallium (Ga), and tellurium (Te) was manufactured. Specifically, Examples 12-1 to 12-3 were manufactured in the same manner as the glass specimen manufacturing method of Example 1-1 above, with the exception that the starting materials were adjusted to the composition of silicon (Si), gallium (Ga), tellurium (Te), and iodine (I) shown in Table 14 below. Additionally, bulk glass formation evaluation, transmission spectrum measurement were performed in the same manner as in Experimental Examples 1 to 5 above, and the results are shown in Table 14 and FIG. 4 below.

TABLE 14

| | Si (at %) | Ga (at %) | Te (at %) | I (at %) | Quality of glass formation |
|---|---|---|---|---|---|
| EXAMPLE 12-1 | 10 | 14 | 75 | 1 | Moderate |
| EXAMPLE 12-2 | 10 | 12 | 75 | 3 | Moderate |
| EXAMPLE 12-3 | 10 | 15 | 65 | 10 | Good |

Referring to Table 14, it can be seen that when the content of the iodine element is 1.0 at % or more and 10.0 at % or less with respect to the total elements, the chalcogenide glass composition further including iodine of the present disclosure can form a stable bulk glass.

Figure 4:
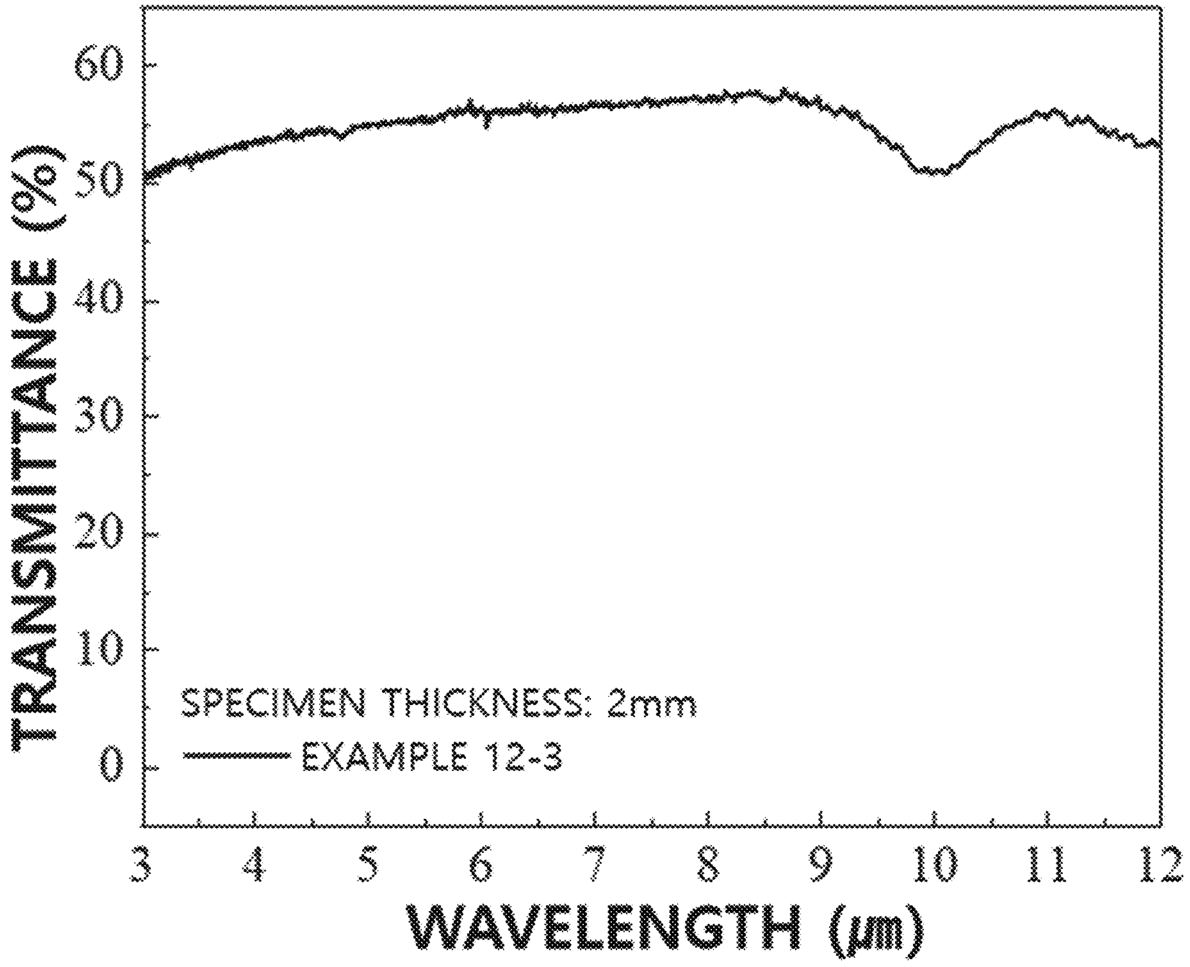
FIG. 4 shows the transmission spectrum of Example 12-3.

Additionally, referring to FIG. 4, it can be seen that Example 12-3 exhibits good transmittance in the wavelength range of 8 to 12 μm used in a long-wavelength infrared range thermal imaging camera.

The invention claimed is:

1. A chalcogenide glass composition comprising:

silicon (Si), gallium (Ga), and tellurium (Te), wherein the composition is devoid of germanium (Ge), wherein with respect to the total elements, the content of the tellurium element ranges from 65.0 at % to 85.0 at %, the content of the gallium element is greater than 2.5 at % and less than 20.0 at %, and the content of the silicon element is greater than 2.5 at % and less than 17.5 at %.

2. The chalcogenide glass composition of claim 1, further comprising one or more elements selected from the group consisting of selenium (Se), bismuth (Bi), indium (In), tin (Sn), antimony (Sb), aluminum (Al), and iodine (I).

3. The chalcogenide glass composition of claim 1 having a Vickers hardness ranging from 1.00 GPa to 1.35 GPa.

4. The chalcogenide glass composition of claim 1 having a refractive index of 3.0 or more at 10 μm in wavelength.

5. A lens made of a chalcogenide glass with compositions according to claim 1.

6. The lens of claim 5 that is formed via a direct machining process, a molding process, a wafer-level molding process, or an imprinting process.

7. The chalcogenide glass composition of claim 2, wherein with respect to the total elements, the content of the indium element ranges from 0.5 at % to 7 at %.

8. The chalcogenide glass composition of claim 2, wherein with respect to the total elements, the content of the antimony element ranges from 1.0 at % to 7 at %.

9. The chalcogenide glass composition of claim 1, wherein the composition is devoid of arsenic (As).

* * * * *